Patented Dec. 6, 1938

2,139,418

UNITED STATES PATENT OFFICE 2,139,418

PHENOLIC CONDENSATION PRODUCT AND METHOD OF MAKING SAME

Nathan M. Mnookin, Kansas City, Mo.

No Drawing. Application July 9, 1936, Serial No. 89,771

11 Claims. (Cl. 260—4)

This invention relates to the production of resins of the phenol-aldehyde condensation type and more particularly to improvements in connections with the catalysts employed in effecting condensation of a phenol and an aldehyde to form resins of the Bakelite type.

In carrying out reactions of the phenol-aldehyde type to form artificial resins, it is conventional practice to employ a suitable catalyst to aid the reaction. The catalysts heretofore employed in these reactions have been of either organic or inorganic nature, such as organic or inorganic acids or bases, for example sulfuric acid, acetic acid, caustic soda solution, ammonia and amines such as para-phenylenediamine, dicyandiamide and methylene-diphenyl-diamine. In addition, various acid or basic salts have been used. In reactions embodying the use of such catalysts, it is necessary to apply heat to the reaction mixture before any reaction between the ingredients will take place.

I have found that reactions between a phenol and an aldehyde will take place at normal room temperatures or even in the cold if the reaction occurs in the presence of a catalyst of the olefine-polyamine type. Thus for example, the initial reaction between phenol and an aldehyde will take place at normal room temperatures in the presence of a small proportion of an alkylene polyamine, or a mixture of such amines suitably those having a boiling point below 300° C. By the use of amines of the alkylene polyamine series such as, for example, ethylene diamine, propylene diamine, diethylene triamine, triethylenetetramine and the like, I have found that the reaction takes place readily at normal room temperatures and even in the cold, and leads in many instances to greatly improved products.

In accordance with my invention, it has been found that when a phenol is condensed with an aldehyde in the presence of a small quantity of an alkylene polyamine, as for example, 0.5% to 5% or higher of ethylene diamine, the diamine acts as a catalyst to promote the condensation so that it practically instantly sets up a vigorous reaction at normal room temperatures. The reaction, being exothermic, may be readily controlled and the resin produced thereby is especially suitable for the manufacture of molding powders, adhesives, varnishes and other commercial uses.

The rate of reaction or the rate at which condensation takes place may be readily controlled by adjusting the quantity of alkylene polyamine added to the reaction mixture. In general, I have found that a quantity of an alkylene polyamine, say in the order of 1% of ethylene diamine, for example, will effect the initial reaction between phenol and formaldehyde at normal room temperatures. If considerably larger proportions of an alkylene polyamine are employed, the reaction is of so vigorous a nature, that efficient cooling means must be provided in order to prevent the condensation proceeding too far and resulting in the formation of insoluble and infusible compounds.

The following are examples of specific processes embodying my invention:

Example 1: Equal volumes of phenol and commercial formalin (containing 27 percent by weight, of formaldehyde) are placed into a suitable vessel as for example a flask and 1% by volume of ethylene diamine is introduced into the reaction mixture. Upon stirring, an immediate vigorous reaction takes place with the evolution of considerable heat. The reacted mixture is cloudy and upon standing, separates into two layers. The upper supernatant aqueous layer is drawn off. The residual liquid may be treated with heat in the conventional manner to form an insoluble and infusible resin such as a resin of the Bakelite type.

Example 2: One mol. of phenol and one mol. of formaldehyde (suitably in the form of commercial formalin containing 37% of formaldehyde by weight) are introduced into a vessel and 1% by volume of triethylenetetramine is slowly introduced into the reaction mixture accompanied by stirring. As before, an immediate vigorous reaction takes place accompanied by the evolution of considerable heat. Upon standing, the reacted mixture separates into two layers and the supernatent liquid is drawn off. The residual liquid is treated in the conventional manner to form an insoluble and infusible end product.

While in the specific examples set forth above, I have described the use of equal volumes of phenol and commercial formaldehyde, it is obvious that my invention is equally applicable to the formation of resins wherein either an excess of phenol or of formaldehyde may be employed. The change in the proportions of the reactants serves to produce resins having varying characteristics. Thus, in accordance with my invention I may produce cast resins of either the transparent or opaque variety. It is furthermore understood that my invention comprehends the use of an alkylene polyamine in proportions greater than or less than the 1% disclosed in the examples. As indicated above, I may use amounts of an alkylene polyamine ranging from 0.5% to 5% and even higher. An increase in the quantity of catalysts used is accompanied by a corresponding increase in the intensity and rapidity of the reaction and therefore the amount of catalyst employed should not be so great as to cause an undue ebullition of the reaction mixture. I have found that amounts in the order of from 1 to 2% give, in substantially all instances, satisfactory results.

Instead of phenol, cresols or cresol mixtures or other phenolic bodies as for example, naphthol, may of course be used.

Instead of formaldehyde, I may use equivalent bodies of aldehyde nature or derivation which react similarly with phenols, as for example, hexamethylene tetramine, acetaldehyde, furfuraldehyde, benzaldehyde and the like, or mixtures of these with formaldehyde.

Instead of a single member of the alkylene polyamine series, I may use a mixture of such amines as, for example a mixture of ethylene diamine, diethylene triamine, and triethylenetetramine, of the similar propylene polyamines, or other suitable mixture.

The products made by my invention are suitable as adhesives, varnishes and the like and may be used in a known manner. The insoluble, infusible, solid vitreous products, owing to the ease with which they can be sawn, bored, cut, polished, shaved and the like and to their stability towards physical and chemical influences, may advantageously serve for making shaped objects of all kinds. According to the use to which the material is to be put, dye stuffs, filling materials and agents imparting elasticity may be added to the material.

This application is a continuation-in-part of my copending application entitled Production of aliphatic polyamines, Serial No. 554,935, filed August 3, 1931 and allowed November 5, 1935 now Patent No. 2,049,467.

I claim:

1. A process for the manufacture of aldehyde condensation products comprising causing phenol to react with formaldehyde in the presence of a non-cyclic alkylene polyamine as the condensing agent or catalyst in catalytic proportion.

2. In the manufacture of artificial resins, the step of condensing a phenol with an aldehyde in the presence of a straight chain alkylene polyamine in catalytic proportions.

3. The manufacture of artificial resins comprising reacting a phenol on commercial formalin in the presence of a catalytic proportion of a straight chain alkylene polyamine and subsequently converting the reaction products to an insoluble and infusible form.

4. In the manufacture of artificial resins, condensing a phenol with an aldehyde in the presence of 1% of a straight chain alkylene polyamine.

5. In the manufacture of artificial resins, the step of condensing a phenol with an aldehyde in the presence of ethylene diamine in catalytic proportions.

6. In the manufacture of artificial resins, the step of condensing a phenol with an aldehyde in the presence of triethylene tetramine in catalytic proportions.

7. In the manufacture of artificial resins, the step of condensing a phenol with an aldehyde in the presence of diethylene triamine in catalytic proportions.

8. In the manufacture of artificial resins, the step of condensing a phenol with an aldehyde in the presence of a mixture of straight chain alkylene polyamines in catalytic proportions.

9. A process for the manufacture of aldehyde condensation products comprising condensing a phenol with an aldehyde in the presence of a straight chain aliphatic olefine polyamine in catalytic proportions.

10. A process for the manufacture of aldehyde condensation products comprising condensing a phenol with an aldehyde in the presence of 0.5 to 5% of a straight chain aliphatic olefine polyamine.

11. A process for the manufacture of aldehyde condensation products comprising condensing a phenol with an aldehyde in the presence of 1% of a straight chain aliphatic olefine polyamine.

NATHAN M. MNOOKIN.